Sept. 22, 1936.   C. A. THOMAS   2,055,393
WIRE WITH SOLDERING FLUX COATING AND METHOD OF MAKING THE SAME
Original Filed May 21, 1932
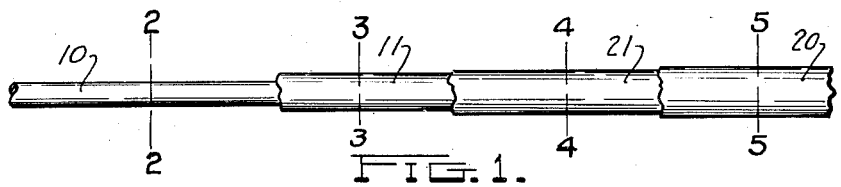
FIG. 1.
  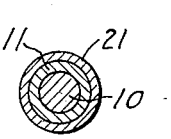 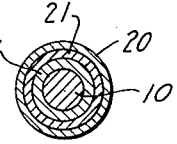
FIG. 2.   FIG. 3.   FIG. 4.   FIG. 5.
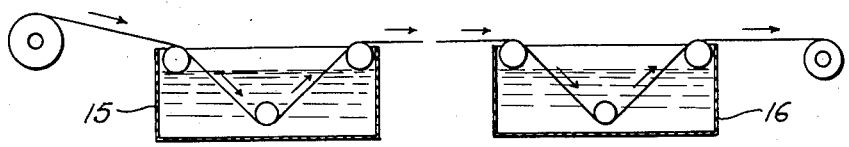
FIG. 6.
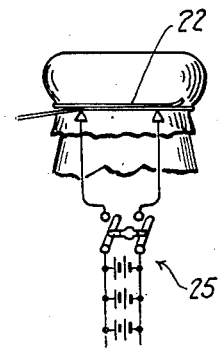
FIG. 7.
Inventor
Charles A. Thomas
By Braselton Whitcomb & Davies
Attorney Patented Sept. 22, 1936

2,055,393

UNITED STATES PATENT OFFICE 2,055,393

WIRE WITH SOLDERING FLUX COATING AND METHOD OF MAKING THE SAME

Charles A. Thomas, Dayton, Ohio, assignor to Standard Cap and Seal Corporation, Chicago, Ill., a corporation of Virginia Original application May 21, 1932, Serial No. 612,870. Divided and this application January 11, 1936, Serial No. 58,778

7 Claims. (Cl. 113—110)

This application is a division of my copending application, Serial Number 612,870, filed May 21, 1932.

The present invention relates to a process of soldering, to-wit, coating wire with a soldering material and a soldering flux together with the article produced thereby.

One of the principal objects of the present invention is to provide a process whereby metallic surfaces, such as tinned steel wire, may be readily cemented together by the application of heat, the effectiveness of such process and the product being unaffected by exposure of the metallic surfaces to air for relatively long periods of time.

The present invention includes the process of providing a metallic wire provided with a soldering coating and applying the combined fluxing and protecting coating of special composition which is unaffected by exposure to air so that the novel product produced thereby is particularly satisfactory for the purposes intended such, for example, as used in sealing milk bottles and the like.

Other objects and advantages of the present invention will be apparent from the following description and appended claims.

The accompanying drawing illustrates one method of carrying the present invention into effect and illustrates one embodiment of the completed wire. Figure 1 is a plan view of the completed wire sections being broken away to show the construction; Figs. 2, 3, 4 and 5 are sectional views taken on the line 2—2, 3—3, 4—4 and 5—5. Fig. 6 is a diagrammatical view illustrating an apparatus for applying the solder and fluxing solution, the wire being broken away between the two baths to indicate the relative possible spacing of the same. Fig. 7 is a diagrammatical view illustrating the wire applied to a cap on a milk bottle and soldered in place.

In carrying out this invention, the wire is first passed through a bath of molten solder and later may be used commercially wherein the tinned surfaces are cemented together by the application of heat. The solder thus acts as a seal to fasten together the metallic surfaces in the desired position, for example, overlapping ends of a wire may be mechanically held in position during the application of heat and until sufficiently cooled and hardened so that the solder holds together the ends in the desired position. This type of seal is especially applicable to wire closures for hood-type bottle caps, such as used on milk bottles and the like.

I have now discovered that when a metallic surface of ferrous metallic wire, coated with solder, either as purchased or in the manufacture of the present product or both, is then coated with a solution of a soluble fluxing agent in a stable oil which is non-oxidizable by exposure to air, such as paraffin oil, such wire may be exposed to air without danger of oxidation or deterioration of the coating film.

As an example of the carrying out of the present invention, the freshly tinned wire having a ferrous metallic core 10 with a usual tin coating 11 if desired or the tinned wire having been first passed through the bath 15 of molten solder is then passed through a bath 16 containing paraffin oil containing in solution approximately 5 per cent by weight of a soluble fluxing agent, such as pine rosin, carnauba wax, halowax or halowax oil (chlorinated naphthalenes). The composition forms on the wire a thin coating 20 lying over the previously coated layer 21 of solder, the protecting and fluxing film being one which is not affected by exposure to air. When it is desired to cement together any surfaces of the coated wire, as for example, overlapping ends 22, the parts to be cemented are clamped or held in the desired position, and heat is then applied in any desired manner as by passing an electric current through the wire as indicated at 25. The tin or solder coating on the wire in conjunction with the fluxing agent coated thereon readily fluxes on the application of heat, and on being allowed to cool it hardens in position. A tight seal between the ends of the wire is thus obtained.

A stable oil which is not affected by exposure to air and which is capable of forming a non-volatile oily film on the surface to be soldered may be used as a solvent or carrier, according to the invention, such for example as asphalt base oils such as paraffin oil, light lubricating oils and the like, which give in view of the large percentages used as herein suggested a lubricating surface to the wire when used in machines for sealing the milk bottles as heretofore stated. A fluxing agent which is readily soluble in the solvent oil used and which is not oxidized, decomposed or rancidified by exposure to air, may be satisfactorily used to form a fluxing composition according to this invention. For example, halowax, halowax oil, pine rosin and carnauba wax have been found to give good results.

The proportions of fluxing agent used may vary widely but in general it has been found that a proportion of approximately 5 per cent by weight of fluxing agent with 95 per cent by weight of non-oxidizing oil, is sufficient to give a satisfactory fluxing action. In some cases considerably less may be used, for example, a composition containing approximately 2½ per cent by weight of carnauba wax and 97½ per cent of paraffin oil has been found satisfactory.

While the methods herein described and the products so produced constitute preferred embodiments of the present invention, it is to be understood that the invention is not limited to these precise methods or precise products, and that changes may be made therein without departing from the scope of the invention which is described in the appended claims.

What I claim is:

1. A method of preparing a sealing wire which comprises passing a solder coated wire through a bath comprising a solution of a non-volatile fluxing agent and a non-oxidizing mineral oil and allowing the solution to form on said wire a thin uniform film which is not materially affected by air.

2. A method of forming sealing wires adapted to be cemented together by fusing a fluxed coating by heat, said method including passing a ferro-metallic cored tinned wire through a bath of molten solder; passing the solder coated wire through a bath comprising a solution of a non-volatile fluxing agent and a non-oxidizing mineral oil and allowing the solution to form on said wire a thin film which is not materially affected by air.

3. A method of preparing a sealing wire which comprises passing a wire through a bath of molten solder to produce a solder coated wire, passing the coated wire through a bath comprising a solution of a non-volatile fluxing agent and a non-oxidizing mineral oil; allowing the solution to form on the wire a thin uniform film which is not materially affected by air, and allowing the wire and coating thereon to cool.

4. A method of forming sealing wires adapted to be cemented together by fusing a fluxed coating by heat, said method including passing a ferro-metallic cored wire through a bath of molten solder; passing the freshly coated wire through a bath comprising a solution of fluxing rosin in a non-oxidizing lubricating oil; allowing the solution to form a uniform thin film on the coating of the wire which is not materially affected by exposure to air, and allowing the completed sealing wire to cool.

5. As a new article of manufacture, a wire having a ferrous metallic core, a coating of solder on said wire and a film of a fluxing composition surrounding said solder, said film comprising a stable, relatively non-volatile, non-oxidizable hydrocarbon oil, and a non-corrosive fluxing agent dissolved therein forming on said solder coated wire a uniform protective film for the purposes set forth.

6. As a new article of manufacture, a wire having a ferrous metallic core, a coating of solder on said wire and a film of a fluxing composition surrounding said solder, said film comprising a stable, relatively non-volatile, non-oxidizable hydrocarbon oil, and a non-corrosive fluxing agent dissolved therein, said film forming on said solder coated wire a uniform protective layer adapted when heat is applied to exert a relatively mild fluxing action for the purposes set forth.

7. As a new article of manufacture, a wire having a ferrous metallic core, a coating of solder on said wire and a film of a fluxing composition surrounding said solder, said film comprising a relatively large proportion of stable non-volatile, non-oxidizable hydrocarbon oil having dissolved therein a relatively small proportion of soluble non-corrosive fluxing agent, said film capable of forming on said solder coated wire a uniform protective layer adapted when heat is applied to exert a relatively mild fluxing action for the purposes set forth.

CHARLES A. THOMAS.